United States Patent
Takeda et al.

(10) Patent No.: US 9,680,341 B2
(45) Date of Patent: Jun. 13, 2017

(54) ROTATING ELECTRIC MACHINE INCLUDING ROTOR CORE WITH SLOTS HAVING PROTRUSIONS

(71) Applicant: Hitachi Automotive Systems, Ltd., Hitachinaka-shi, Ibaraki (JP)

(72) Inventors: Norio Takeda, Tokyo (JP); Satoshi Kikuchi, Tokyo (JP); Yutaka Matsunobu, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 164 days.

(21) Appl. No.: 14/422,400

(22) PCT Filed: Jul. 29, 2013

(86) PCT No.: PCT/JP2013/070410
§ 371 (c)(1),
(2) Date: Feb. 19, 2015

(87) PCT Pub. No.: WO2014/034344
PCT Pub. Date: Mar. 6, 2014

(65) Prior Publication Data
US 2015/0236555 A1 Aug. 20, 2015

(30) Foreign Application Priority Data

Aug. 31, 2012 (JP) ................................. 2012-190815

(51) Int. Cl.
*H02K 21/12* (2006.01)
*H02K 1/27* (2006.01)
*H02K 1/28* (2006.01)

(52) U.S. Cl.
CPC .............. *H02K 1/276* (2013.01); *H02K 1/28* (2013.01)

(58) Field of Classification Search
CPC .................................. H02K 1/27; H02K 1/22
(Continued)

(56) References Cited

U.S. PATENT DOCUMENTS

| 4,327,302 A | 4/1982 | Hershberger |
| 2001/0017499 A1 | 8/2001 | Kaneko et al. |

(Continued)

FOREIGN PATENT DOCUMENTS

| JP | 2-179253 A | 7/1990 |
| JP | 9-308148 A | 11/1997 |

(Continued)

OTHER PUBLICATIONS

International Search Report (PCT/ISA/210) dated Sep. 17, 2013 with English-language translation (Four (4) pages).

*Primary Examiner* — Jose Gonzalez Quinone
(74) *Attorney, Agent, or Firm* — Crowell & Moring LLP (57) ABSTRACT

Provided is a rotating electric machine that combines high efficiency and high strength reliability. The rotating electric machine includes: a stator having a coil and a stator core; and a rotor opposed to the stator with a gap intervening between the rotor and the stator, the rotor having permanent magnets 3 and a rotor core 2. The rotor is configured such that the permanent magnets are buried in V-shape at hole-shaped slots 4 disposed in the rotor core to form one pole, and the pole is formed in plurality in a circumferential direction. Each of the slots is an open slot partially opened toward an outer circumference of the rotor core. The slot is provided with a hook-shaped structure 6 to support corresponding one of the permanent magnets in an open portion thereof.

3 Claims, 13 Drawing Sheets (58) Field of Classification Search
USPC .............. 310/156.01, 156.28, 156.53, 56.56, 310/156.56, 156.21
See application file for complete search history.

(56) References Cited

U.S. PATENT DOCUMENTS

| | | |
|---|---|---|
| 2003/0030343 A1 | 2/2003 | Naito et al. |
| 2011/0156521 A1* | 6/2011 | Nagashima .......... H02K 1/2766 310/156.28 |
| 2011/0291515 A1* | 12/2011 | Li .......................... H02K 21/16 310/156.53 |
| 2013/0113328 A1 | 5/2013 | Kogure et al. |

FOREIGN PATENT DOCUMENTS

| | | | | |
|---|---|---|---|---|
| JP | 2001-314052 A | 11/2001 | | |
| JP | 2003-61280 A | 2/2003 | | |
| JP | 2004-104962 A | 4/2004 | | |
| JP | 2011-4480 A | 1/2011 | | |
| JP | WO 2012011191 A1 * | 1/2012 | .......... H02K 1/2766 |
| WO | WO 2012/011191 A1 | 1/2012 | | |

\* cited by examiner

ROTATING ELECTRIC MACHINE INCLUDING ROTOR CORE WITH SLOTS HAVING PROTRUSIONS

TECHNICAL FIELD

The present invention relates to a rotating electric machine.

BACKGROUND ART

Rotating electric machines (motors and generators) that employ permanent magnets are used in applications that need a compact and lightweight machine design and high machine performance. In general, a rotor of a rotating electric machine which uses permanent magnets includes a rotor core formed into a cylindrical shape by stacking thin steel plates in an axial direction. Stacking the steel plates provided with holes to insert permanent magnets forms permanent magnet insertion slots in the rotor core, so that the permanent magnets are mounted in the slots. In addition, the rotor core is fixed to a shaft that serves as a rotating shaft, and forms one of the major elements constituting the rotor.

Placement forms of the permanent magnets with respect to the rotor core can be broadly classified into a surface magnet type and an embedded (i.e., interior) magnet type. The surface magnet type is the form where, as described in Patent Document 1, for example, the permanent magnets are attached at predetermined intervals to an outer circumferential surface of the rotor core. The rotor of the surface magnet type can effectively use magnetic fluxes of the permanent magnets because the fluxes do not become short-circuited inside the rotor core. However, since the permanent magnets are liable to crack or peel by reason of centrifugal force, the surface magnet type is not suitable for high-speed rotating applications. In addition, an increase in a temperature of the permanent magnets due to a loss of an eddy current is liable to reduce efficiency. To improve these drawbacks, Patent Document 1 gives a description that in addition to first permanent magnets arranged on the outer circumferential surface of the rotor core, second permanent magnets are arranged at an inner diameter side of the first permanent magnets.

Figure 12:
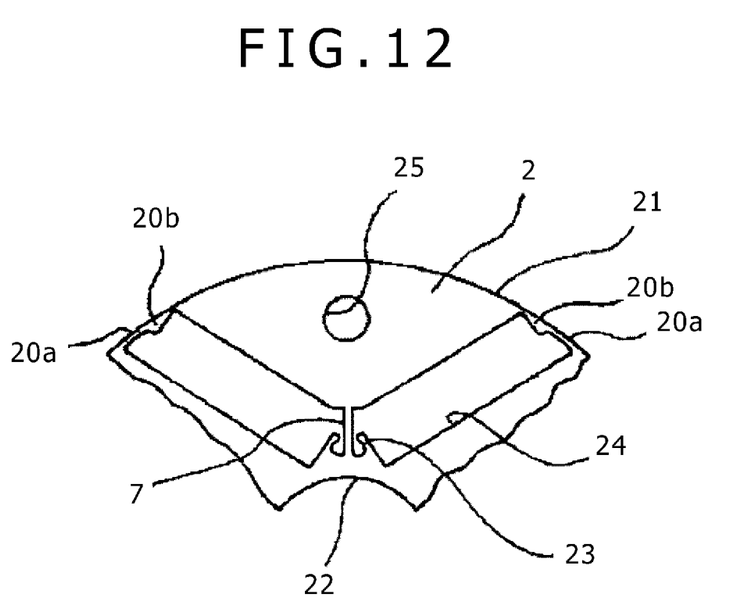
FIG. 12 is a sectional view that shows one magnetic pole, the view being included in a sectional view of the rotor core in the rotor of the conventional embedded magnet type.

In a motor of the embedded magnet type, as described in Patent Document 2, for example, the permanent magnets are included in closed holes, that is, closed slots, of the rotor core, so the cracking or peeling of the permanent magnets due to centrifugal force can be prevented. A section of this rotor core that forms a structural member equivalent to one pole is shown in FIG. 12. In addition to the prevention of damage to the permanent magnets, this rotor structure has an advantage that the loss of the eddy current can be reduced. Furthermore, as in the motor described in Patent Document 2, providing two slots in a V-shaped arrangement to form one pole and then embedding a permanent magnet in each of the slots enables reluctance torque to be effectively used in the interpolar rotor core and hence a compact and highly efficient motor to be implemented. Moreover, in the motor of Patent Document 2, the slots in the rotor core have a resilient mechanism, which integrates the permanent magnets and the rotor core and enhances rigidity of the rotor.

Patent Document 3 refers to another rotor of the embedded magnet type. This rotor is substantially the same as that of Patent Document 2 in that the rotor core includes two permanent magnets embedded in each of V-shaped slots. However, a magnetic pole section and yoke section of the rotor core, respectively positioned at an outer diameter side and inner diameter side of the rotor core across the V-shaped slots, are not connected to one another and a filler formed from a curable nonmagnetic substance is placed between the two permanent magnets in each slot to form the rotor. Additionally, the V-shaped slots are notched toward an outer circumference of the rotor core. In other words, the rotor core employs an open-slotted structure in which the slots are not internally closed holes of the rotor core and include a portion opened toward the outer circumference of the core.

Patent Document 4 refers to yet another rotor of the embedded magnet type. This rotor is substantially the same as that of Patent Document 2 or 3 in that the rotor core includes two permanent magnets embedded in each of V-shaped slots. The slots formed in the rotor core, however, are constructed by alternate stacking of two kinds of steel plates, namely one kind with such closed slots as described in Patent Document 2, and the other kind with such open slots as described in Patent Document 3, and the two kinds of slotted steel plates form the rotor core.

PRIOR ART LITERATURE

Patent Documents

Patent Document 1: JP-2003-61280-A
Patent Document 2: JP-1997-308148-A
Patent Document 3: JP-1990-179253-A
Patent Document 4: JP-2011-4480-A

SUMMARY OF THE INVENTION

Problems to be Solved by the Invention

General rotors of the embedded magnet type suffer the short-circuiting of magnetic fluxes inside the rotor core because of the so-called closed-slotted structure where slots are provided in hole-shaped form in the rotor core, as shown in Patent Document 2. It is also desirable that permanent magnets be arranged as close as possible to an outer diameter edge of the rotor core to obtain greater magnet torque. Achieving this arrangement requires forming V-shaped slots as close as possible to the outer diameter edge of the rotor core. This result in narrow portions 20*a*, 20*b* being formed to the rotor core disposed at even outer diameter side than the slot, as shown in FIG. 12. Since the narrow portions 20*a*, 20*b* external to the slots at the outer diameter side will be highly stressed by centrifugal force, the narrow portions 20*a*, 20*b* will need to have dimensions of a certain value or more in order to cause no mechanical damage such as fracture. For these reasons, the use of magnet torque has its limits in the rotor structure of the type in which the permanent magnets are embedded in the closed slots.

To prevent magnetic flux short-circuiting inside such a rotor core and to make best use of magnet torque, there is a method in which open slots are used as the slots for embedding the permanent magnets therein. However, using the open slots allows, during rotor rotation, a mass of the permanent magnets and that of the rotor core positioned closer to the slot regions at the outer diameter side, to be applied to a narrow portion of the rotor core that is present between the two slots arranged in the V-shaped form. That is to say, the narrow portion 7 between the slots, shown in FIG. 12, will be highly stressed by centrifugal force. The narrow portion 7 between the slots will need to have dimensions of a certain value or more in order to suppress the stress to a permissible level or less. The short-circuiting of magnetic fluxes, however, will result if too large dimensions are assigned to the interslot narrow portion 7.

To solve this problem, according to Patent Document 3, the curable nonmagnetic substance is used as a filler between the slots constituting one pole, but this method needs a number of machining man-hours for the formation of the rotor. In addition, since a bonded section between the curable nonmagnetic substance and the rotor core is stressed by centrifugal force, it is necessary that the bonded section be highly reliable in strength. According to Patent Document 4, open-slotted steel plates and closed-slotted steel plates are stacked alternately in units of several sheets to avoid an increase in a stress of interslot narrow portions due to the use of an open-slotted structure. However, the narrow portions of the closed-slotted steel plates, positioned at the outer diameter side of the rotor core, need to bear the force augmented by the centrifugal force, and thus the permanent magnets become difficult to be arranged at the outer diameter side.

Accordingly, the present invention provides a rotating machine constructed to suppress internal magnetic flux short-circuiting of a rotor core and to combine high efficiency and high strength reliability by including permanent magnets at positions closer to an outer diameter side than in the conventional embedded magnet type.

Means for Solving the Problems

The configuration described in CLAIMS, for example, is adopted to solve the foregoing problems. The present invention includes a plurality of means to solve the problems. One example of these means is outlined below. A rotating electric machine includes: a stator having a coil and a stator core; and a rotor opposed to the stator with a gap intervening between the rotor and the stator, the rotor having permanent magnets and a rotor core, the rotor being configured such that the permanent magnets are buried in V-shape at hole-shaped slots disposed in the rotor core to form one pole, the pole being formed in plurality in a circumferential direction, wherein each of the slots is an open slot partially opened toward an outer circumference of the rotor core, and the slot is provided with a hook-shaped structure to support corresponding one of the permanent magnets in an open portion thereof.

Effects of the Invention

In accordance with the present invention, a rotating machine that combines high efficiency and high strength reliability can be provided. Problems, constituent elements, and advantageous effects other than above will be made apparent by the following description of embodiments.

MODE FOR CARRYING OUT THE INVENTION

Hereunder, embodiments of the present invention will be described using the accompanying drawings.

Figure 13:
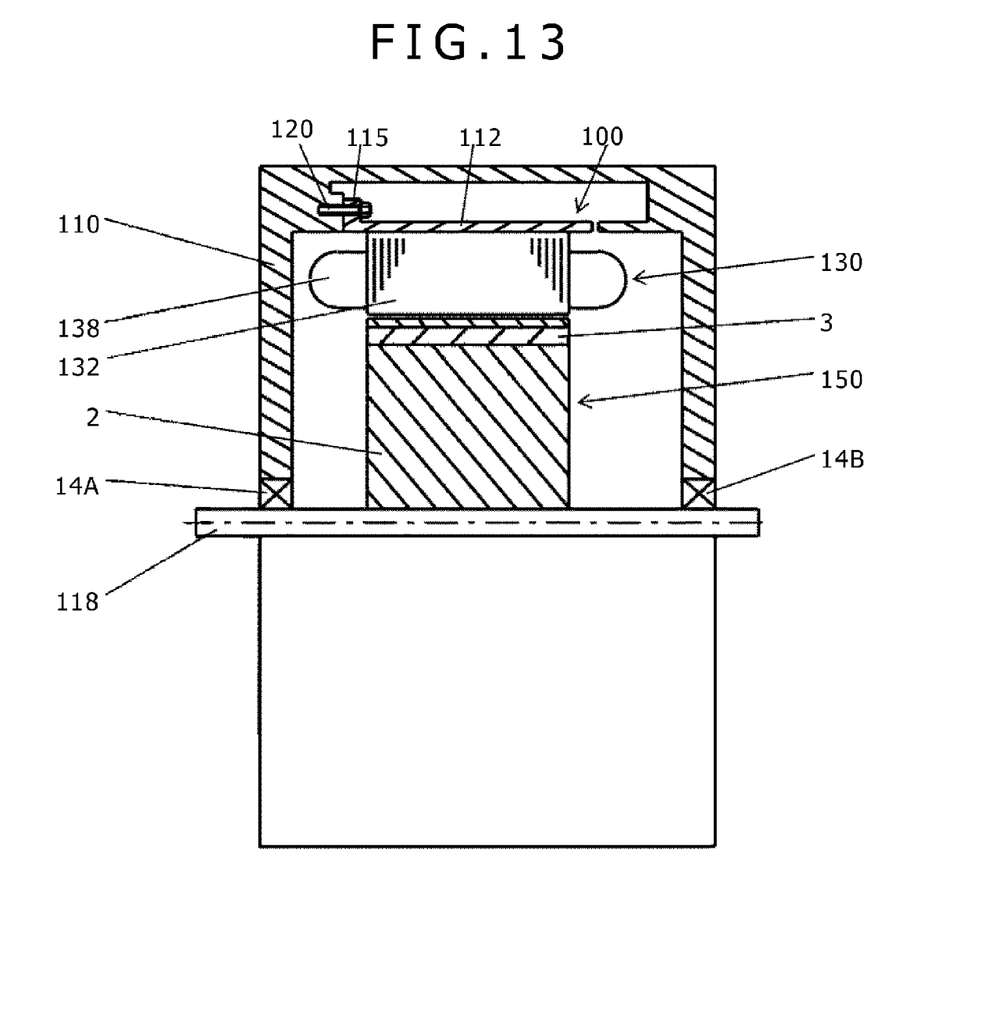
FIG. 13 is a schematic diagram showing the entire rotating electric machine common to the first to third embodiments.

First, an overall configuration of a rotating electric machine 100 common to the embodiments of the present invention is described below using FIG. 13. FIG. 13 represents part of the rotating electric machine 100 in sectional view, thus showing an internal region of the rotating electric machine 100. As shown in FIG. 13, the rotating electric machine 100 is disposed inside a casing 110 and includes a housing 112, a stator 130 with a stator core 132 fixed to the housing 112, and a rotor 150 rotatably disposed in the stator. The casing 110 is constituted by a casing of an engine and/or a casing of a transmission.

The rotating electric machine 100 is a three-phase synchronous motor with built-in permanent magnets. The rotating electric machine 100 operates as an electric motor that rotates the rotor 150 by means of a three-phase alternating current supplied to a stator coil 138 wound around the stator core 132. In addition, when driven by the engine, the rotating electric machine 100 operates as a generator to generate and output three-phase alternating-current power. In other words, the rotating electric machine 100 has both of a motor function that generates rotational torque based on electrical energy, and a generator function that generates electricity according to mechanical energy. The rotating electric machine can selectively use one of the two functions, depending on a traveling state of the automobile.

The stator 130 is fixed to the housing 112. The stator 130 is fixedly retained inside the casing 110 due to a flange 115 on the housing 112 being fastened to the casing 110 by bolts 120. The rotor 150, fixed to a shaft 118, is supported by bearings 14A and 14B within the casing 110 and rotatably retained internally with respect to the stator core 132.

First Embodiment

Figure 1:
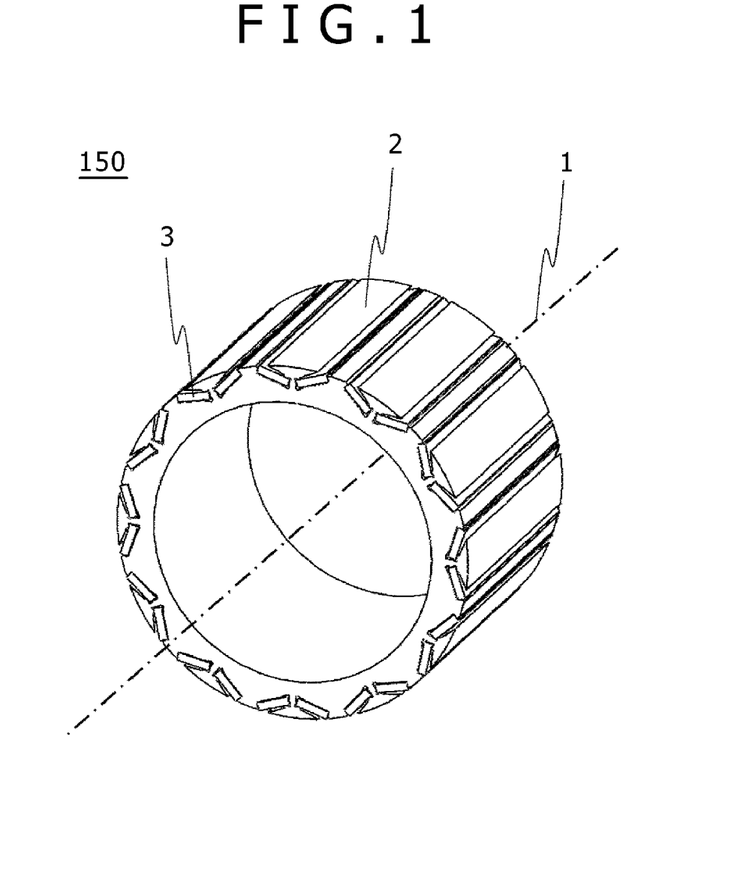
FIG. 1 is a perspective view showing a first structural example of a rotating electric machine according to a first embodiment of the present invention.
Figure 2:
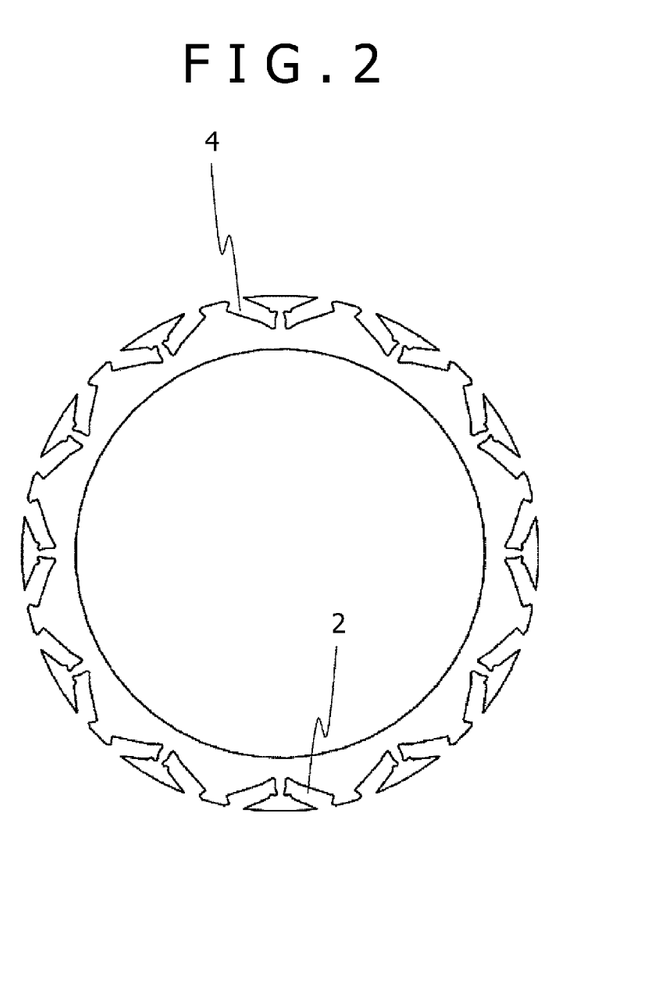
FIG. 2 is a sectional view of a rotor core that shows the first structural example of the rotating electric machine according to the first embodiment.
Figure 3:
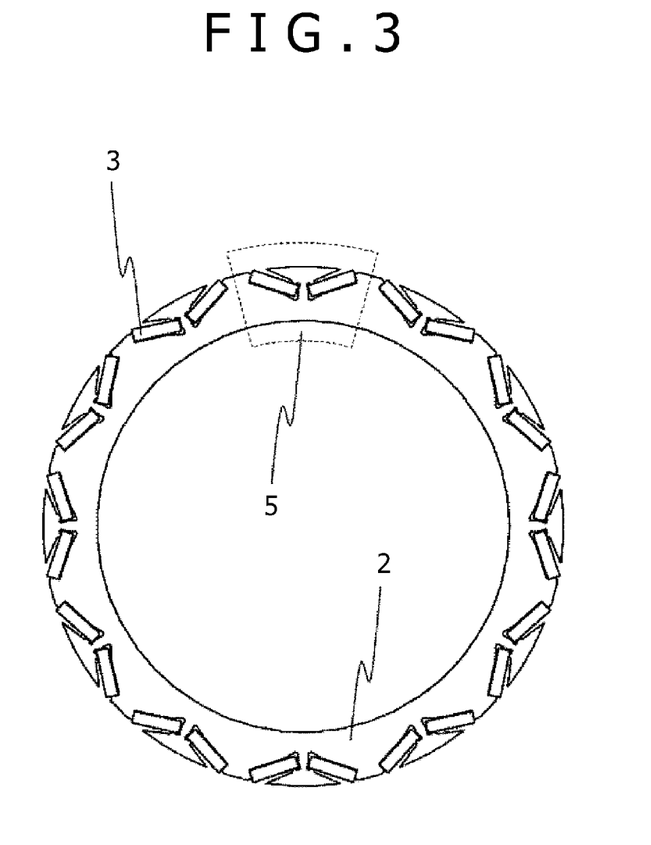
FIG. 3 is a sectional view of the rotor core and permanent magnets that shows the first structural example of the rotating electric machine according to the first embodiment.
Figure 4:
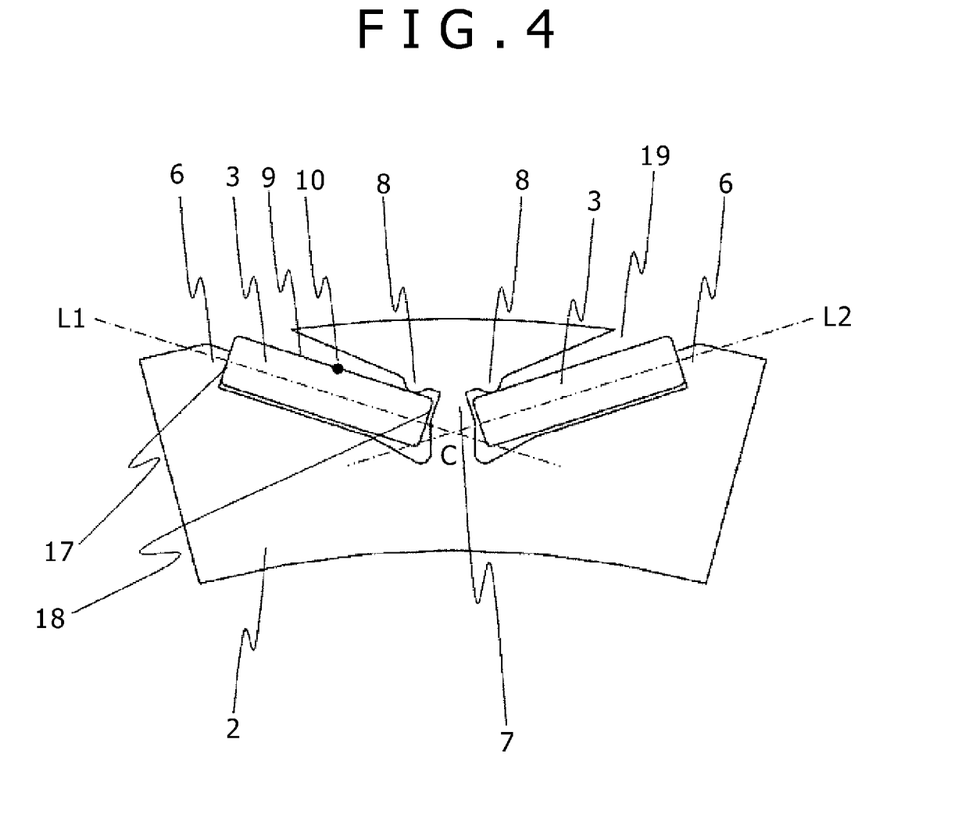
FIG. 4 is an enlarged sectional view of one magnetic pole, the view being included in a sectional view showing the first structural example of the rotating electric machine according to the first embodiment.
Figure 5:
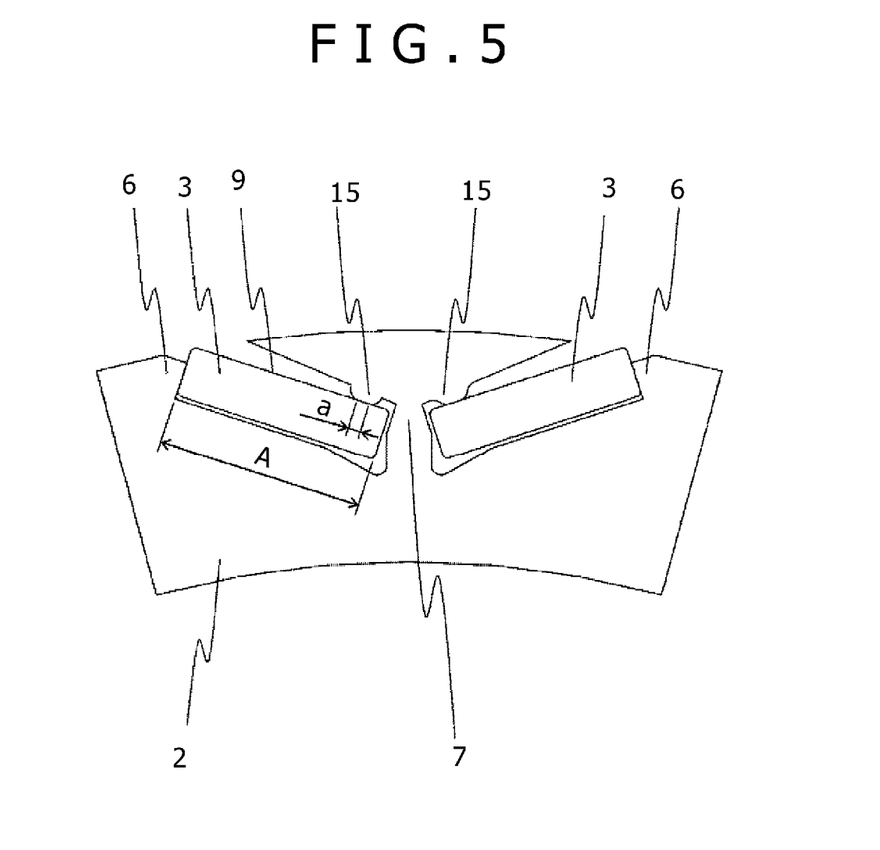
FIG. 5 is an enlarged sectional view of one magnetic pole, the view being included in a sectional view showing a structural example derived from the first structural example of the rotating electric machine according to the first embodiment.
Figure 6:
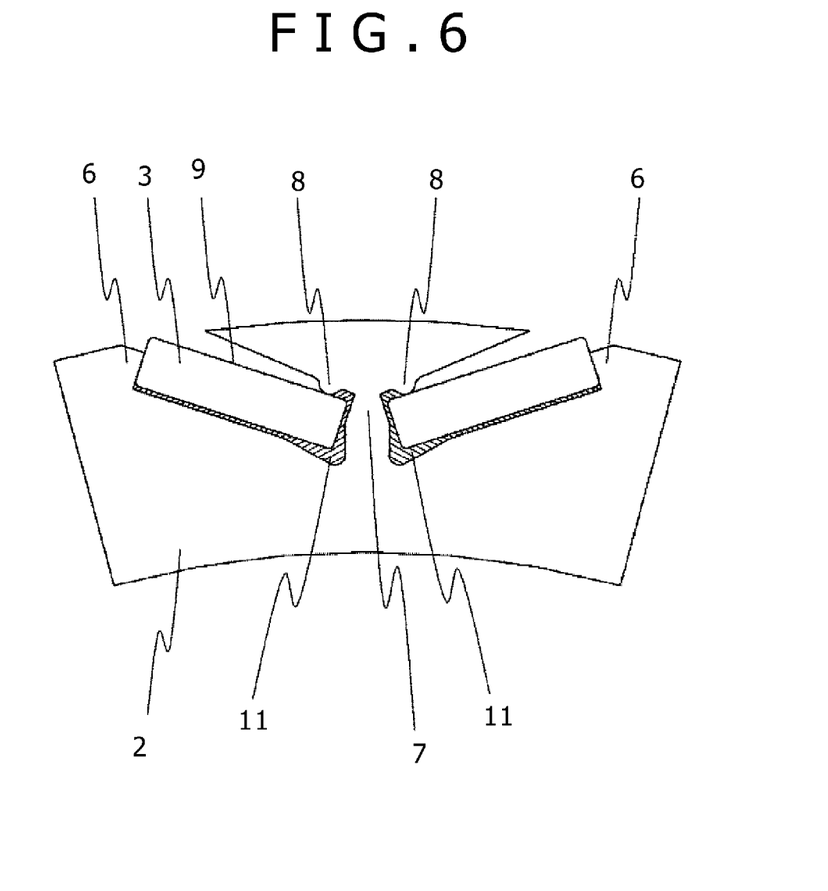
FIG. 6 is an enlarged sectional view of one magnetic pole where clearances between permanent magnets and the rotor core are filled with resin, the view being included in a sectional view showing the first structural example of the rotating electric machine according to the first embodiment.

A first structural example of a rotating electric machine according to a first embodiment of the present invention is described below using FIGS. 1 to 6. FIG. 1 is a perspective view that shows a rotor core and permanent magnets, both constituting an embedded (interior) magnet type of rotor in the rotating electric machine. FIG. 2 is a sectional view taken perpendicularly to an axial direction of the rotor core in FIG. 1. FIG. 3 is a sectional view of a structure with buried permanent magnets in FIG. 2. FIGS. 4, 5, 6 are enlarged sectional views only of a specific angle of construction that constitutes one pole shown in FIG. 3.

As shown in FIG. 1, the embedded magnet type of rotor 150 has a structure with the permanent magnets 3 buried in the rotor core 2. As shown in FIG. 2, slots 4 that are holes for inserting the permanent magnets are provided at certain intervals in a circumferential direction of the rotor core 2. Thin steel plates having a sectional shape shown in FIG. 2 are stacked in a direction of a rotational axis 1 to construct the rotor core 2. One magnetic pole 5 is formed in a circumferential direction of the rotor by inserting one permanent magnet 3 in each of two slots 4 provided in V-shaped form in the rotor core 2. For example, neodymium magnets, samarium-cobalt magnets, or ferrite magnets are used as the permanent magnets 3. The structural example of the present embodiment can likewise be made by using other permanent magnets.

The permanent magnets 3 that have been inserted into the slots 4 are arranged in V-shaped form so that an open end of the V-shaped form faces an outer circumferential edge of the rotor core 2 (i.e., outward in a radial direction). As shown in FIG. 4, therefore, a crossing point of center lines L1 and L2 that are parallel to a long side of a section of each permanent magnet 3 does not agree with a center of the rotor axis 1. Each slot 4 has its outer diameter side opened toward the outer circumferential edge of the rotor core 2, thereby forming an open portion 19. A hook-shaped structure 6 is disposed in a region of the rotor core that neighbors the open portion 19, and the structure 6 is contiguous to an outer diameter short side 17 of the section of the permanent magnet 3 and bears a force that is exerted upon the permanent magnet by centrifugal force.

As a result, despite of the rotor core 2 being cut at the open portion 19, magnitude of a stress acting upon an interslot narrow portion 7 in the rotor core 2 is much the same as magnitude of stresses occurring at one place in a conventional closed-slotted structure. Additionally, an outer diameter long side 9 of the permanent magnet 3 is in contact at one point with a protrusion 8 provided in the slot 4 of the rotor core 2, and the outer diameter long side 9 of the permanent magnet 3 and the rotor core 2 are not in linear contact (not in surface contact, if considered three-dimensionally). The protrusion 8 is closer to an inner diameter short side 18 than to a midpoint 10 of the outer diameter long side 9. During fabrication of the permanent magnet 3, the protrusion 8 and the hook-shaped structure 6 also function to facilitate placement of the magnet 3 in a position shown in FIG. 4.

Referring to FIG. 4, the protrusion 8 provided in the slot 4 has an arc-shaped end, so that the protrusion 8 and the outer diameter long side 9 of the permanent magnet 3 are in contact at one point. As opposed to this, if a length "a" of line is imparted to the end of the protrusion 8, the permanent magnet 3 and the protrusion 8 come into linear contact. However, if the length "a" of the end of the protrusion 8 is small relative to length A of the outer diameter long side 9 of the permanent magnet 3, a rate at which the central force on the permanent magnet 3 is transmitted to the interslot narrow portion 7 can be reduced, as in a case that the protrusion is arc-shaped.

A structure shown in FIG. 5, therefore, is also embraced in a category of the present embodiment of the invention. In addition, if an inner diameter clearance 11 between the permanent magnet 3 and the rotor core 2 is filled in with a resin as shown in FIG. 6, this enables movement of the permanent magnet 3 to be suppressed during operation of the rotating electric machine, and thus, mechanically high reliability to be imparted to the rotating electric machine.

Figure 7:
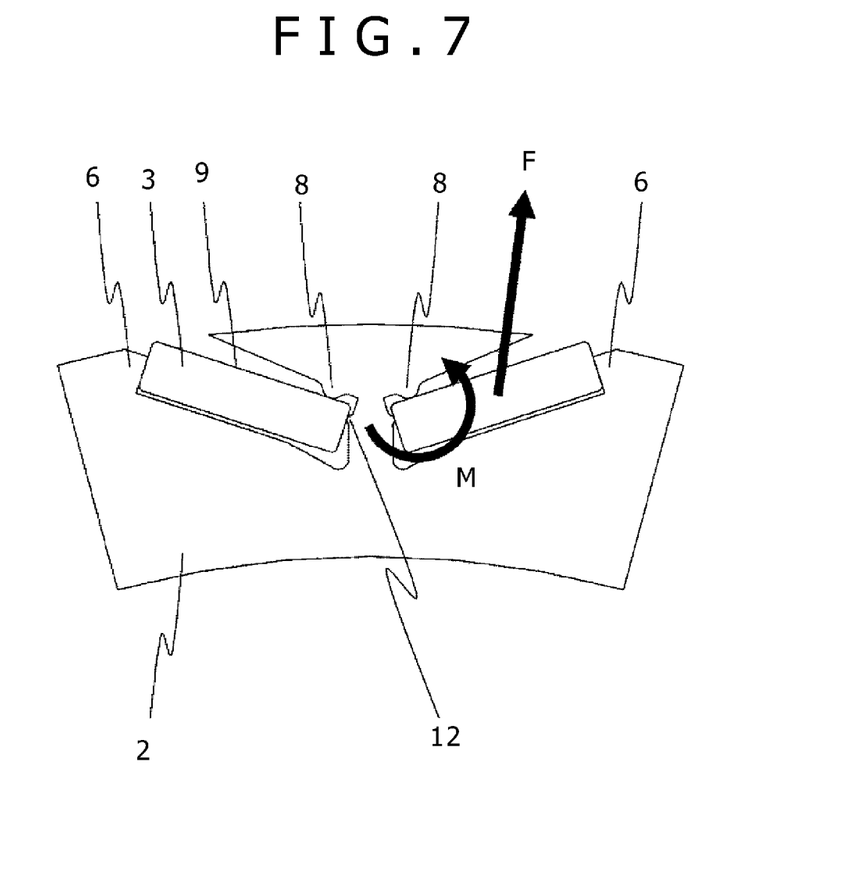
FIG. 7 is an enlarged sectional view of one magnetic pole, the view being included in a sectional view showing a second structural example of the rotating electric machine according to the first embodiment.
Figure 8:
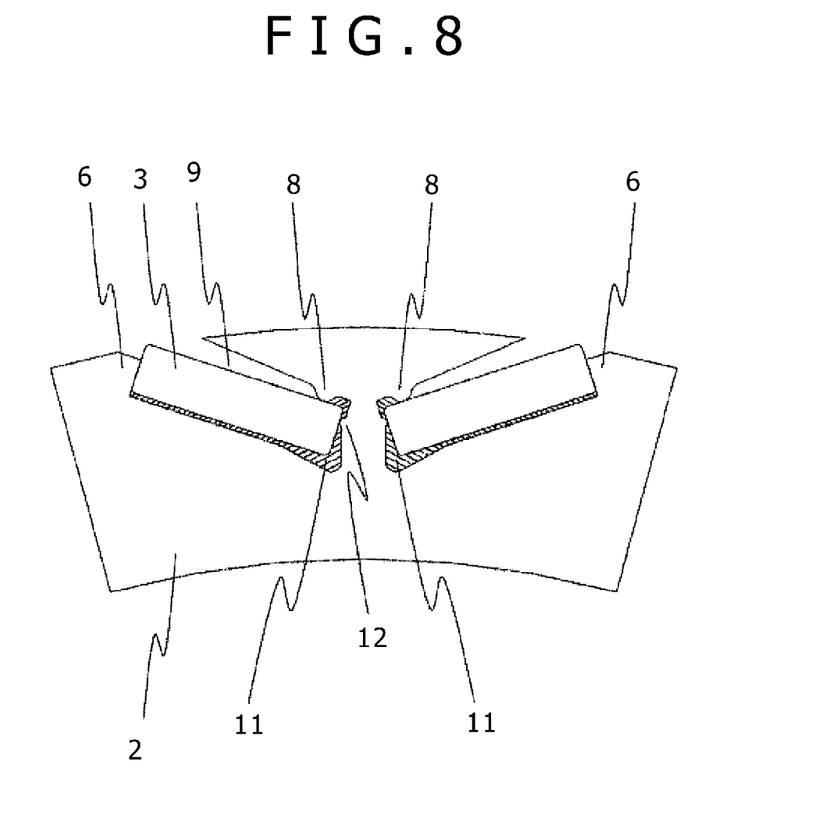
FIG. 8 is an enlarged sectional view of one magnetic pole where clearances between permanent magnets and the rotor core are filled with resin, the view being included in a sectional view showing the second structural example of the rotating electric machine according to the first embodiment.

FIGS. 7 and 8 are sectional views showing a second structural example of a rotating electric machine according to the first embodiment of the present invention.

An inner diameter short side 18 of a permanent magnet 3 is in contact with a second protrusion 12 provided in a slot 4 of a rotor core. With the second protrusion 12, this magnet can be easily placed in a position shown in FIG. 7 in fabrication of the permanent magnet 3. In addition, as indicated by an arrow, when centrifugal force F acts upon the permanent magnet 3, the second protrusion 12 works with a hook-shaped structure 6 to bear a moment M exerted upon the permanent magnet 3 with the protrusion 8 as a fulcrum.

In the second structural example according to the first embodiment, if an inner diameter clearance 11 between the permanent magnet 3 and the rotor core 2 is filled in with a resin, then during operation of the rotating electric machine, the permanent magnet 3 can also be stably retained in one of positions shown in FIGS. 7 and 8.

As can be seen from the above, in the present embodiment, since the slots are opened toward the outer circumferential edge of the rotor core, no magnetic fluxes become short-circuited via a narrow portion present at the outer diameter side of the slots in the rotor core. Additionally, since a narrow portion is absent at the outer diameter side of the slots, the permanent magnets can be placed at positions extremely close to the outer diameter side, and magnet torque can be consequently used to its maximum. Furthermore, since a narrow portion is absent at the outer diameter side of the slots, there is no need to fear likely occurrence of mechanical fracture of an outer diameter region of the slots due to centrifugal force. A large portion of the centrifugal force acting upon the permanent magnets during rotation is supported by the hook-shaped structure disposed near the open section of the slots. Thus, the stress developed at the interslot narrow portion can be suppressed below a permissible level without increasing the dimension of the narrow portion.

As described in Patent Documents 3, 4, if an outer diameter surface of each permanent magnet and the rotor core are in surface contact, the large portion of the centrifugal force acting upon the permanent magnet will be transmitted to the interslot narrow portion through the rotor core. This will result in the interslot narrow portion being highly stressed in comparison with a case of a closed-slotted structure. In contrast to this, in the rotating electric machine according to the present embodiment, since the outer diameter surface of the permanent magnet and the rotor core are not in surface contact, the large portion of the centrifugal force acting upon the permanent magnet during rotation can be supported by the hook-shaped structure disposed near the open section of the slots. In addition, the provision of a protrusion in each slot facilitates positioning of the permanent magnet as inserted into the slot during magnet fabrication.

Furthermore, if a contact point between the outer diameter long side of the permanent magnet is positioned closer to the outer diameter side than to the midpoint on the outer diameter long side of the permanent magnet, the large portion of the centrifugal force acting upon the permanent magnet will be transmitted to the interslot narrow portion of the rotor core via the contact point. As a result, the hook-shaped structure disposed near the open section of the slot will reduce the effect of bearing the centrifugal force exerted upon the permanent magnet. If the contact point between the outer diameter long side of the permanent magnet is positioned closer to the inner diameter side than to the midpoint on the outer diameter long side of the permanent magnet, the hook-shaped structure will be more effectively bear the centrifugal force upon the permanent magnet.

Moreover, after the permanent magnet has been inserted into the slot, contact sections between the permanent magnet and the rotor core will increase, which will in turn make it easier to position the permanent magnet inside the slot. Besides, if in addition to the first protrusion of the slot that is disposed so as to come into contact with the outer diameter long side of the permanent magnet, a second protrusion is provided so as to come into contact with an adjacent side of the permanent magnet, the second protrusion will effectively work to impede the movement of the permanent magnet, hence allowing stable machine construction to be prepared.

Second Embodiment

Figure 9:
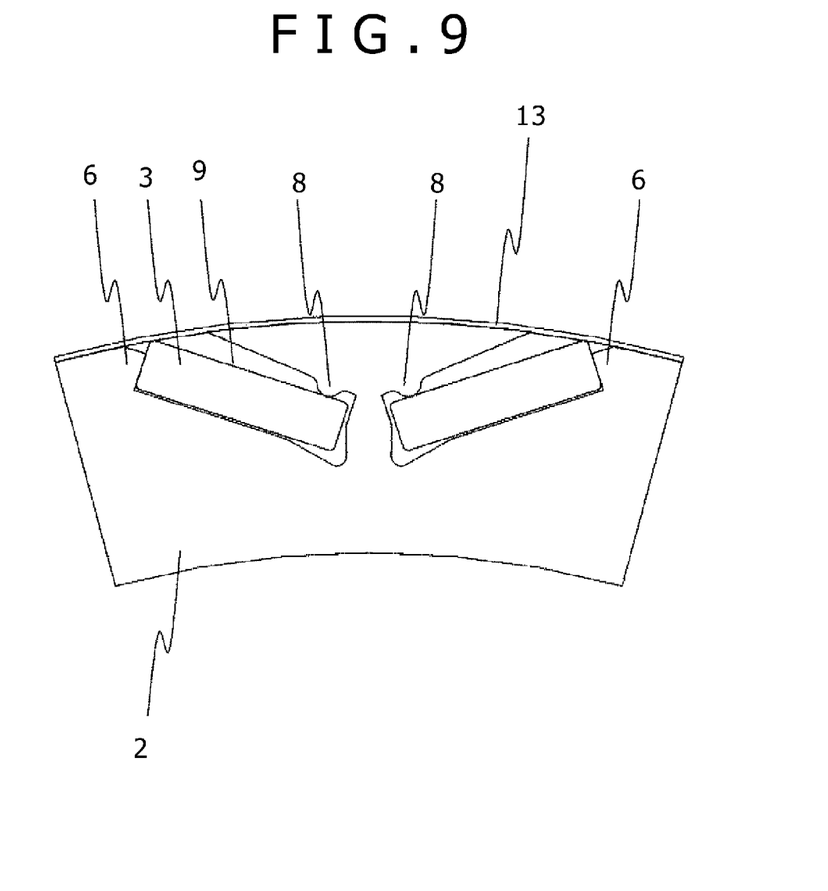
FIG. 9 is an enlarged sectional view of one magnetic pole, the view being included in a sectional view showing a structural example of a rotating electric machine according to a second embodiment of the present invention.
Figure 10:
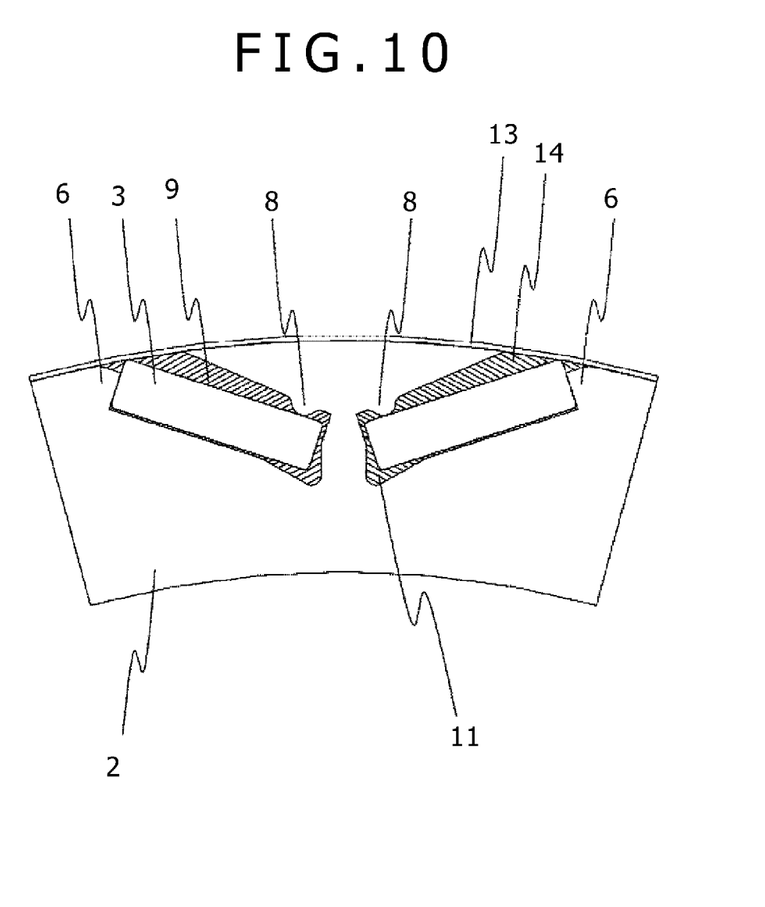
FIG. 10 is an enlarged sectional view of one magnetic pole where clearances between permanent magnets and the rotor core are filled with resin, the view being included in a sectional view showing the structural example of the rotating electric machine according to the second embodiment.

A structural example of a rotating electric machine according to a second embodiment of the present invention is described below using FIGS. 9 and 10. FIG. 9 is a sectional view showing the structural example of the rotating electric machine according to the second embodiment of the present invention. FIG. 10 is a sectional view that shows construction with resin-filled clearances between permanent magnets 3 and rotor core 2 shown in FIG. 9.

Referring to FIG. 9, a thin film 13 is formed on an outer circumference of the rotor core 2. The thin film 13 can be constituted by either reinforced-fiber plastic, a nonmagnetic metal, or the like. The thin film 13 helps to stabilize a position of each permanent magnet 3 during operation of the rotating electric machine. In addition, in contrast to a case that a surface magnet type of rotor is used, a substantial rate of a centrifugal force upon the permanent magnet 3 does not need to be borne by the thin film 13. Thus, this film can be made very thin, which enables the permanent magnet 3 to be distanced away from an outer diameter side of the rotor core 2 and a reduction in magnet torque to be minimized. Furthermore, adoption of the thin film 13 enables, as shown in FIG. 10, an outer diameter clearance 14 as well as an inner diameter clearance 11 between the permanent magnet 3 and the rotor core 2 to be filled in with a resin, and hence the rotating electric machine to perform stable operation.

Forming the thin film on the outer circumference of the rotor in this form retains the permanent magnet more strongly and rigidly inside the slot. In addition, since the clearances between the permanent magnet and the rotor core can be more easily filled in with a resin, a rigid and highly strength-reliable rotor structure can be obtained.

Third Embodiment

Figure 11:
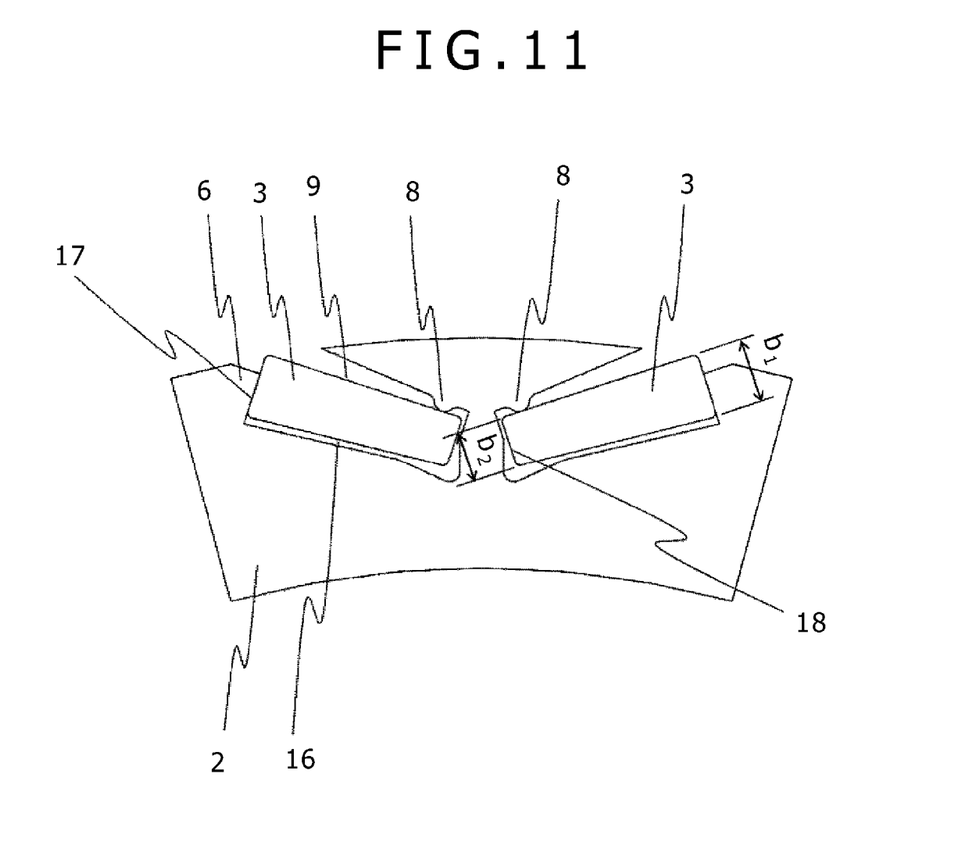
FIG. 11 is an enlarged sectional view of one magnetic pole, the view being included in a sectional view showing a structural example of a rotating electric machine according to a third embodiment of the present invention.

Next, a structural example of a rotating electric machine according to a third embodiment of the present invention is described below using FIG. 11. FIG. 11 is a sectional view showing the structural example of the rotating electric machine according to the third embodiment of the present invention.

Referring to FIG. 11, an outer diameter short side 17 of each of permanent magnets 3 has length b1 different from length b2 of an inner diameter short side 18 of each of the permanent magnets 3. If the permanent magnets 3 are neodymium magnets or other permanent magnets that are difficult to machine, the permanent magnets 3 are rectangular in cross-sectional shape, as in the embodiments shown in up to FIG. 10. If the permanent magnets 3 are ferrite magnets or other permanent magnets that are easy to machine, the permanent magnets 3 do not need to be rectangular in cross-sectional shape.

Therefore, a structure varied in the cross-sectional shape of the permanent magnets 3, as in the structural example of the present embodiment, is selectable. While in the structural example of FIG. 11 the cross-sectional shape of the permanent magnets 3 is trapezoidal, the present invention may be embodied by adopting the cross-sectional shape of the permanent magnets 3 that optimizes characteristics of the electric machine. That is to say, neither an outer diameter long side 9, outer diameter long side 16, outer diameter short side 17, nor inner diameter short side 18 of each permanent magnet 3 needs to be rectilinear and the embodiment of the present invention can be constructed if a hook-shaped structure disposed near an open section 19, and a protrusion 8 (if necessary, the second protrusion 12 shown in FIG. 7) are formed so as to come into contact with the permanent magnet 3.

As described above, in accordance with the present invention, the short-circuiting of magnetic fluxes inside the rotor core can be suppressed while maintaining the strength reliability of the embedded magnet type of rotor, and magnet torque can be increased. Thus, a usage quantity of the permanent magnets which contain expensive rare earth can be reduced and permanent magnets not containing expensive rare earth can be used to provide a compact high-performance rotating electric machine.

The present invention is not limited to/by the above-described embodiments and embraces a variety of modifications. For example, the embodiments have only been described for a better understanding of the invention and are therefore not necessarily limited to the configurations containing all described constituent elements. In addition, part of the configuration of a certain embodiment may be replaced by the configuration of another embodiment and the configuration of a certain embodiment may be added to the configuration of another embodiment. Furthermore, part of the configuration of each embodiment may be added to, deleted from, and/or replaced by the other embodiments.

DESCRIPTION OF REFERENCE CHARACTERS

1: Rotational axis
2: Rotor core

3: Permanent magnet
4: Slot
5: One magnetic pole
6: Hook-shaped structure
7: Interslot narrow portion
8: Protrusion
9: Outer diameter long side of section of permanent magnet
10: Midpoint on outer diameter long side of section of permanent magnet
11: Inner diameter clearance between permanent magnet and rotor core
12: Second protrusion
13: Thin film
14: Outer diameter clearance between permanent magnet and rotor core
15: Protrusion that is not arc-shaped at end
16: Inner diameter long side of section of permanent magnet
17: Inner diameter short side of section of permanent magnet
18: Outer diameter short side of section of permanent magnet
19: Open portion of slot
20a, 20b: Narrow portions at outer diameter side of slot

The invention claimed is:

1. A rotating electric machine comprising:
a stator including a coil and a stator core; and
a rotor opposed to the stator with a gap intervening between the rotor and the stator, the rotor including permanent magnets and a rotor core, the rotor being configured such that the permanent magnets are buried in V-shape at hole-shaped slots disposed in the rotor core to form one pole, the pole being formed in plurality in a circumferential direction, wherein:
each of the slots is an open slot partially opened toward an outer circumference of the rotor core;
the slot is provided with a hook-shaped structure to support corresponding one of the permanent magnets in an open portion thereof; and
the slot includes a protrusion so that on a section perpendicular to an axial direction of the rotor, the permanent magnet comes into contact with the rotor core at a position closer to an inner diameter side of the rotor than to a midpoint on an outer diameter long side of the permanent magnet.

2. The rotating electric machine according to claim 1, wherein:
a thin film is formed on the outer circumference of the rotor.

3. A rotating electric machine comprising:
a stator including a coil and a stator core; and
a rotor opposed to the stator with a gap intervening between the rotor and the stator, the rotor including permanent magnets and a rotor core, the rotor being configured such that the permanent magnets are buried in V-shape at hole-shaped slots disposed in the rotor core to form one pole, the pole being formed in plurality in a circumferential direction, wherein:
each of the slots is an open slot partially opened toward an outer circumference of the rotor core;
the slot is provided with a hook-shaped structure to support corresponding one of the permanent magnets in an open portion thereof;
the slot includes a first protrusion so that an outer diameter long side of the permanent magnet comes into contact with the rotor core at one place on a section perpendicular to an axial direction of the rotor; and
the slot includes a second protrusion so that on the section perpendicular to the axial direction of the rotor, an inner diameter short side of the permanent magnet adjacent to the outer diameter long side of the magnet comes into contact with the rotor core.

* * * * *